Aug. 14, 1945.  J. B. ARMITAGE  2,382,935
VARIABLE SPEED DRIVE MECHANISM
Filed May 12, 1943  2 Sheets-Sheet 2
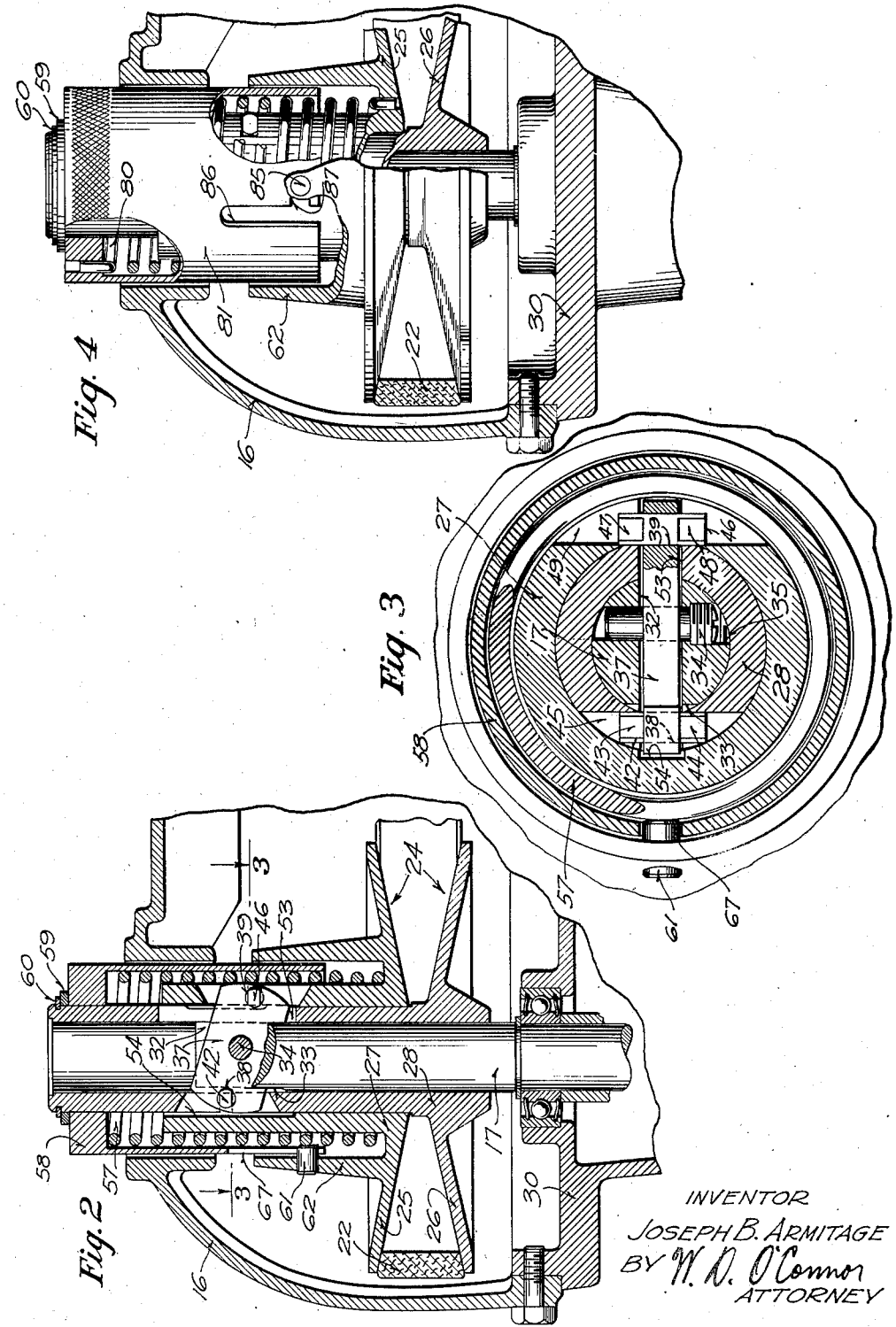
INVENTOR
JOSEPH B. ARMITAGE
BY W. D. O'Connor
ATTORNEY Patented Aug. 14, 1945

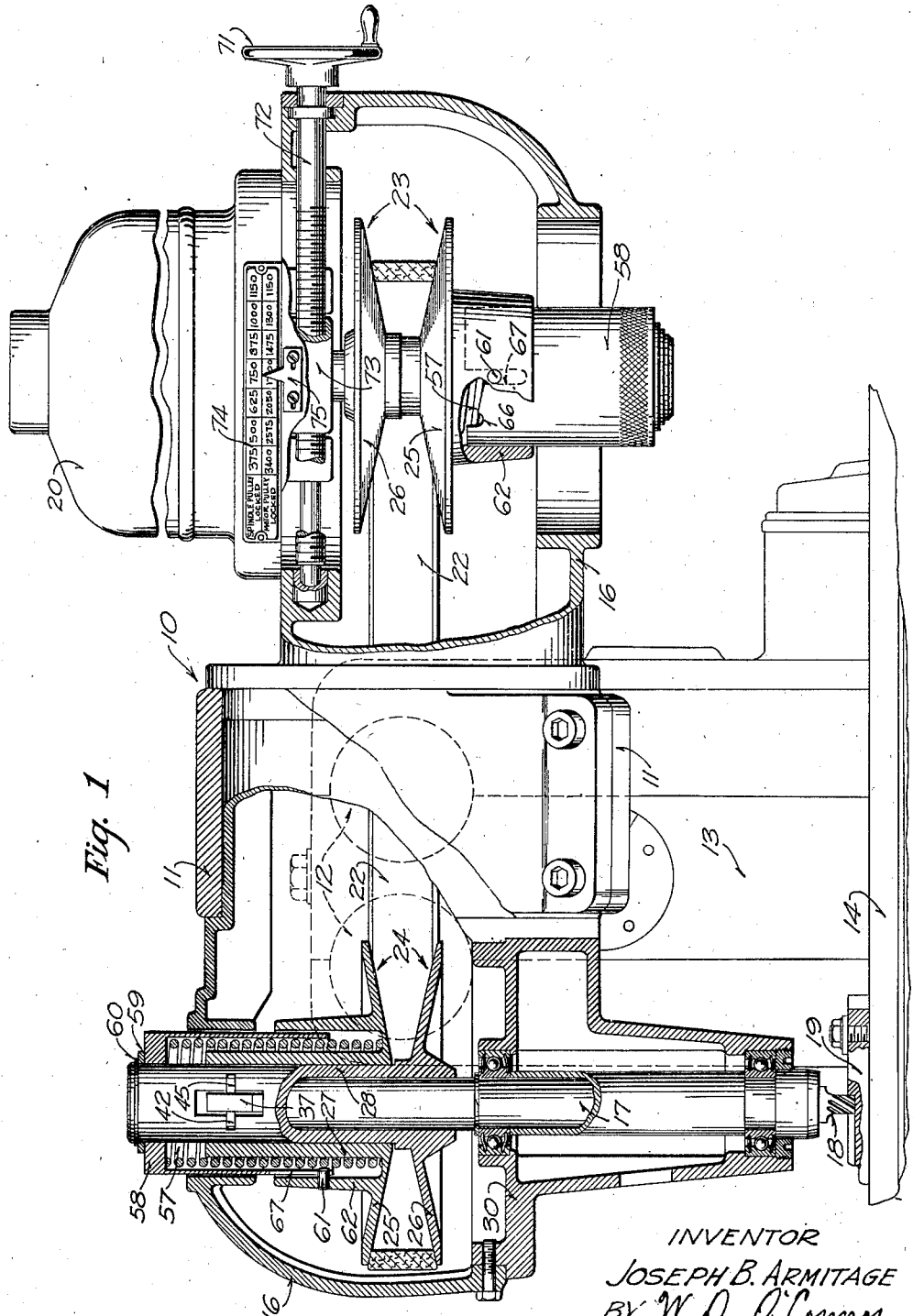

2,382,935

UNITED STATES PATENT OFFICE 2,382,935

VARIABLE SPEED DRIVE MECHANISM

Joseph B. Armitage, Wauwatosa, Wis., assignor to Kearney & Trecker Corporation, West Allis, Wis., a corporation of Wisconsin Application May 12, 1943, Serial No. 486,682

17 Claims. (Cl. 74—230.17)

This invention relates, generally, to power transmission mechanism and more particularly to an improved variable speed drive of the V-belt and pulley type.

In a well-known variable speed belt drive, a V-belt is arranged to cooperate with a pair of pulleys in one of which the effective pitch diameter may be varied, the variable pulley being formed by axially separable diverging disks resiliently urged towards each other and adapted to be forced apart by the belt when it is drawn into the groove formed between them. When the disks move apart and the belt moves inward, the pitch diameter of the pulley is decreased and conversely when the disks move together and the belt moves outward the pitch diameter is increased, thereby varying the transmission ratio.

A primary object of the present invention is to provide an improved variable speed drive of the expansible pulley type.

Another object of the invention is to provide a variable speed belt drive mechanism adapted to operate in more than one speed range.

Another object of the invention is to provide a variable speed belt transmission mechanism including a plurality of variable diameter belt pulleys so arranged that the diameter of any pulley may be varied selectively.

Another object of this invention is to provide a compact, simple, easy to adjust variable speed transmission having each of two pulleys adjustable yet capable of being individually locked thereby giving a double range of speed variation.

Another object is to provide an improved resiliently expansible belt pulley that is arranged to be locked selectively against expansion or contraction.

A further object of the invention is to provide a variable speed belt drive mechanism including a plurality of expansible pulleys arranged to be locked selectively to provide for operation of the mechanism in different speed ranges.

According to this invention, a variable speed belt drive mechanism is arranged to operate in two ranges of speed variation. The mechanism may be constituted by a pair of expansible V-groove pulleys and a cooperating V-belt, the pulleys being of similar construction and resiliently biased to their contracted or maximum diameter positions. In order that the two ranges of speed variations may be effected, each of the expansible pulleys is provided with locking means the pulleys being locked alternatively thereby preventing expansion or contraction of one while permitting the unlocked pulley to change its pitch diameter in response to force exerted by the belt. By this arrangement, a low range of speed variation may be effected by locking the driven pulley while permitting the driving pulley to change in diameter from its minimum or slow speed diameter to its maximum diameter. Conversely, for effecting operation in a high speed range, the driving pulley is locked and the driven pulley is permitted to vary in diameter from its maximum diameter to its minimum or high speed diameter.

The foregoing and other objects of this invention, which will become more fully apparent from the following detailed specification, may be achieved by the particular structures constituting exemplifying embodiments of the invention that are depicted in and described in connection with the accompanying drawings, in which:

Figure 1 is a view in front elevation, showing the upper part of a milling machine fitted with an attachment in which the invention is embodied in practical form, parts of the attachment frame having been broken away to show the driving mechanism;

Fig. 2 is an enlarged view in vertical section through the driven expansible belt pulley on the attachment spindle, showing the equalizing linkage and locking mechanism;

Fig. 3 is a view in horizontal section, taken transversely of the driven spindle axis along the line 3—3 in Fig. 2; and, Fig. 4 is a view generally similar to Fig. 2, but showing a modified form of the invention.

The particular structure illustrated in the drawings as exemplifying apparatus of the class adapted to embody mechanism constructed and operated in accordance with the principles of the present invention, is primarily an attachment for a milling machine, although it is to be understood that the invention may be utilized with equal advantage as an integral part of a complete machine tool or with other machinery of generally similar construction.

Referring more particularly to the drawings and especially to Fig. 1 thereof, the structure embodying the invention is there shown as constituting a high speed milling attachment indicated generally by the reference numeral 10. As there illustrated, the attachment 10 is fastened to a supporting machine structure by means of a clamping fixture 11 that engages one of a pair of overarms 12 projecting forwardly from an upstanding column 13 of a milling machine of standard construction. The milling machine column 13 also carries a work support or table 14 movably mounted thereon in the usual manner.

The high speed milling attachment 10 comprises essentially a frame or hollow body portion 16 in one end of which a vertically disposed cutter carrying spindle 17 is rotatably mounted. As shown, the spindle 17 is positioned to support a milling cutter 18 in cooperating relationship with the work table 14 for engaging and operating upon an object such as a work piece 19 that may be clamped on the table in well-known manner.

The attachment frame 10 supports at its other end a spindle driving motor 20 that is slidably mounted thereon for horizontal movement with its shaft disposed vertically in parallel relationship with the cutter carrying spindle 17. Driving power is transmitted from the shaft of the motor 20 to the cutter spindle 17 by an improved transmission mechanism incorporating the present invention and including a V-belt 22 that operates over a driving expansible pulley 23 on the motor shaft and a similar driven expansible pulley 24 on the spindle shaft 17. The pulleys 23 and 24 are biased to their contracted or maximum diameter positions and are arranged to be expanded by action of the cooperating V-belt 22 when it is drawn into the pulley grooves. In the particular structure illustrated, expansion or contraction of the pulleys by the belt is effected by changing the distance between the two pulleys, this being accomplished by moving the slidably mounted motor 20 along the frame 16.

In accordance with the improved speed changing arrangement provided by the present invention, either of the two expansible pulleys may be locked against expansion or contraction while the effective driving diameter of the other pulley is adjusted by action of the belt to change the speed ratio. By this arrangement, two ranges of speed adjustment may be effected through locking the one or the other pulley alternatively, the unlocked pulley serving to effect the speed adjusting action throughout its full range of operation. Accordingly, when the driving pulley on the motor shaft is unlocked, the transmission operates throughout a low range of speed effected by change in the driving pulley adjustment from its smallest effective pitch diameter to its largest effective pitch diameter. On the other hand, when the driven pulley on the tool spindle is unlocked, the transmission operates through a high speed range from its largest effective pitch diameter to its smallest effective pitch diameter.

Referring now to Fig. 2, the driven expansible pulley 24 on the tool spindle 17 is constituted by a pair of diverging conical disks or pulley halves 25 and 26 which cooperate to form a V-groove of variable width for receiving the power transmitting V-belt 22. As shown, the conical disks or pulley halves 25 and 26 are provided with extending sleeve portions or hubs 27 and 28, respectively, projecting upwardly, the sleeve 28 of the disk 26 being telescoped within the sleeve 27 of the disk 25. The two sleeves are interconnected by means of a link mechanism which is disposed to cause an equal movement of the two disks when adjusting to a different speed, thereby maintaining a fixed center line for the V-belt 22 and preventing its lateral movement. The expansible driving pulley 23 is similarly composed of a pair of complementary conical disks or pulley halves 25 and 26 also having sleeves 27 and 28, the sleeves in this instance projecting downwardly, since the entire pulley structure, although constituted by similar elements, is inverted.

As may best be seen in Fig. 1, the tool spindle 17 is rotatably mounted in a bearing case 30 that is releasably fastened in the frame 16 for ready removal to facilitate application or removal of the belt 22. As shown in Figs. 2 and 3, the spindle 17 has a slot 32 extending transversely from a flattened portion 33 at one side of its upper end. A threaded pivot pin 34, which passes through a transverse threaded hole 35 in the spindle 17, holds a link 37, provided at its ends with transverse holes 38 and 39, respectively. The hole 38 at the left end of the link serves to receive a transverse driving pin 42 having flattened side portions 43 and 44 adjacent to its ends which engage the side walls of a slot 45 in the inner pulley sleeve 28. The transverse hole 39 at the opposite end of the link 37 receives the mid-portion of a transverse driving pin 46 exactly like the pin 42. The pin 46 has flattened side portions 47 and 48 which engage the side walls of a slot 49 in the outer pulley sleeve 27. The inner sleeve 28 has a cut away portion or longitudinal slot 53 to permit vertical movement of the end of the link that engages the outer sleeve to permit the movement required by it in changing the speed. Also, a longitudinal slot 54 is formed in the outer sleeve 27 to accommodate the movement of the other end of the link 37.

As shown, the outer sleeve 27 is encircled by a spiral compression spring 57 which bears at one end against the wall of the pulley half 25 and at the other end against a cap 58. The cap 58 is fastened to the top of the inner sleeve 28 by means of a washer 59 and a snap ring 60. In addition to retaining the spring 57, the cap 58 also functions in conjunction with a locking pin 61 to lock the pulley against expansion. Thus confined, the spring 57 is disposed to urge the pulley flanges together in an effort to maintain the pulley at maximum pitch diameter for cooperation with the belt, the action of the spring being equally effective on the two flanges, since it operates through the equalizing link mechanism previously described.

The latching or locking mechanism for preventing expansion or contraction of the pulleys is best seen in Fig. 1 in association with the right hand or drive pulley 23. The locking of the pulley halves is effected in maximum pitch diameter position and is accomplished by turning the cap 58 to engage a bayonet notch or recess 66 formed in it with the pin 61, which is secured to and projects inwardly from an encircling sleeve 62 on the pulley half 25. This prevents axial movement of the pulley half 25 and indirectly through the linking mechanism likewise prevents axial movement of the pulley half 26. When the pulley is unlocked, the pin 61 is disengaged from the notch 66 and is free to move within the limits of a long axial slot 67 in the cap 58, thereby permitting axial movement of the pulley halves 25 and 26 which then are free to assume a position that is the resultant of the force exerted by the spring 57 and the force exerted by the constant length belt 22.

The position of the belt 22 within the pulley groove is adjusted by horizontal movement of the motor 20 along the frame 16, which is accomplished by turning a hand wheel 71 attached to a screw shaft 72. As shown in Fig. 1, the screw shaft 72 has threaded engagement with a lug 73 depending from the motor 20 which is slidably mounted on the upper surface of the frame.

Attached to the motor base at a point adjacent to the frame 16 is a speed indicating gauge 74. For cooperating with the scale or gauge 74, a pointer 75 is fastened to the frame 16 at a point adjacent to the motor base, and in a position to indicate relative movement between the two on the gauge. By reading the gauge 74 at the point indicated by the pointer 75 and on one of two lines or series of indicia, determined by which one of the two variable pitch pulleys is locked, the approximate speed of the spindle pulley may be ascertained.

To follow a complete cycle of speed changing through both speed ranges from the slowest cutter speed to the fastest, the driven pulley 23 may first be locked in its maximum pitch diameter position, and the motor 20 moved to its extreme right position by the screw shaft 72. Since the constant length belt 22 is not long enough to accommodate both the pulleys 23 and 24 being at maximum pitch diameter with the motor in this position, movement of the motor 20 to its extreme right position on its slide tends to tighten the belt, thereby overcoming the longitudinal resilience of the spring 57 and causing the unlocked pulley 23 to expand to its minimum diameter or low speed position. At this position, the pointer 75 will indicate a tool spindle speed of 375 revolutions per minute on the gauge 74, the upper line of indicia on the gauge being read to determine the speed when the driven spindle pulley 24 is locked.

To increase the tool spindle speed, the hand wheel 71 may now be turned to move the motor 20 to the left along the frame. As the motor is thus moved, the belt tends to slacken and allows the longitudinal resilience of the spring 57 to urge the pulley halves 25 and 26 together, thereby increasing the effective pitch diameter of the pulley. Since the motor used is preferably of a substantially constant speed type, this will cause the spindle pulley 24 to increase in speed gradually as the motor is moved from right to left. The tool spindle speed may be ascertained approximately at any time by referring to the upper line of indicia on the gauge, which in the particular arrangement shown reads 375, 500, 625, 750, 875, 1000 and 1150, revolutions per minutes. It is to be understood, however, that any speed between those indicated may be attained and that the number of speeds available is infinite.

When the motor reaches its extreme left position, the pulley 23 will be completely contracted and at its position of maximum pitch diameter. With both pulleys the same size, their speeds will be equal, the tool spindle then turning at the speed of the motor, in this instance 1150 revolutions per minute. This completes a change of speed through one range.

The shift into the other speed range is brought about by turning the cap 58 of the driving pulley 23 to engage the pin 61 in the bayonet notch 66, which locks the pulley 23 in its position of maximum pitch diameter, and then turning the cap 58, of the pulley 24 in the other direction to unlocked position. The hand wheel 71 is again turned to move the motor 20, this time to the right, and since the motor pulley is locked in its maximum pitch diameter position, the tool spindle pulley must expand, thereby decreasing its effective pitch diameter and increasing its speed. As the motor slides to the right along the frame, the pointer 75 will indicate approximate speeds of 1150, 1300, 1475, 1700, 2050, 2575 and 3400 revolutions per minute, the lower line of the gauge being read to determine the speed when the motor pulley 23 is locked.

The embodiment of the invention shown in Fig. 4 has pulley halves and link mechanisms identical with those of the embodiment just described. However, it differs from the previously described embodiment in that the type of spring used and the locking mechanism employed are of modified form. This embodiment employs a combined torsional and compression spring 80, the resilient action of which urges rotation of a cap 81, corresponding to the previously mentioned cap 58, and the pulley half 25 relative to each other in addition to urging them apart longitudinally. The cap 81 receives a pin 85 in a longitudinal slot 86 therein, having a short transverse slot or notch 87 opening at right angles from one end thereof. The pin 85 is in turn secured in the sleeve 62 of the pulley half 25, as in the case of the previously mentioned pin 61. The torsional resiliency of the spring 80 acts in a direction disposed to hold the pin 85 tightly against that side of the longitudinal slot 86 from which the transverse slot 87 extends, and likewise, to urge the pin into and hold it within the transverse slot 87 when the pin is brought into register with the slot. The short transverse slot 87 is placed at the relative longitudinal position assumed by the pin 85 when the pulley halves 25 and 26 are closest together, that is, in the maximum pitch diameter position. Accordingly, when the pulley halves 25 and 26 assume their maximum pitch diameter position, the pin 85 is urged automatically into the short transverse slot 87 by the torsional resiliency of the spring 80, thereby preventing any further longitudinal movement of the pulley halves. This automatic locking of the pulley halves in maximum pitch diameter position facilitates the manual operation in changing from the one speed range to the other.

To follow a complete cycle of speed changing through both speed ranges with this modification of the structure, it is again desirable to begin with the motor moved to its extreme right position and with the driven tool spindle pulley 24 locked in its maximum pitch diameter position. To increase the speed of the tool spindle, the same procedure is followed as previously described, in that the motor may be moved by the screw shaft in a manner to bring the two variable pitch pulley axes closer together, thereby allowing contraction of the unlocked motor pulley 23 until a point is reached at which the motor pulley assumes its maximum pitch diameter. At this point, the pin 85 will slip from the longitudinal slot 86 into the short transverse slot 87, thereby locking the motor pulley 23 automatically. It only remains then, for the operator to unlock the tool spindle pulley 24 and slide the motor, by means of the hand wheel and screw shaft, in a manner to increase the distance between the pulley axes, causing the unlocked pulley to expand and decrease its effective pitch diameter, thereby further increasing the speed of the spindle.

From the foregoing detailed explanation of the construction and operation of exemplifying transmission mechanisms set forth as practical embodiments of the present invention, it will be apparent that there has been provided an improved variable speed drive mechanism that is especially adapted for convenient utilization in a machine tool or machine tool attachment to provide in a compact structure a speed changer capable of a wide scope of speed variations.

Although the illustrated embodiments of the invention have been set forth in detail to fully disclose a practical operative mechanism by means of which the invention may be practiced, it is to be understood that the apparatus so described is intended to be illustrative only and that various novel characteristics of the invention may be incorporated in other structural forms without departing from the spirit and scope of the invention as defined in the subjoined claims.

The principles of the invention having now been fully explained and illustrative embodying apparatus described, I hereby claim as my invention:

1. In a variable speed device, a pair of parallel shafts, an expansible driving pulley on one of said shafts, an expansible driven pulley on the other of said shafts, transmission means operably connecting said pulleys, means for selectively locking said driven pulley in a fixed pitch diameter position, means for varying the pitch diameter of said driving pulley while said driven pulley is locked, means for selectively locking said driving pulley in a fixed pitch diameter position, and means for varying the pitch diameter of said driven pulley while said driving pulley is locked, whereby a selected variable speed within either one of two speed ranges may be imparted to the driven shaft.

2. In a V-belt transmission mechanism, a pair of expansible V-belt receiving pulleys, a V-belt disposed to cooperate with said pulleys, means supporting said pulleys for movement toward or from each other to effect expansion or contraction of said pulleys through action of said belt upon them, and means to lock either of said pulleys in manner to prevent expansion or contraction thereof while permitting expansion and contraction of the other pulley to effect adjustment of the driving ratio, the arrangement being such that the driving ratio between said pulleys may be varied throughout two speed ranges by locking said pulleys alternatively.

3. In a variable speed belt transmission mechanism, a pair of cone pulleys of the expansible type, a V-belt arranged to cooperate with said cone pulleys to transmit power between them, each of said pulleys comprising a pair of diverging side plates, a spring arranged to urge said plates resiliently toward each other to adjust the pulley to its position of maximum pitch diameter, said plates being separated in opposition to said spring by action of said belt when it is drawn into the pulley, and a latching device associated with said plates and arranged to latch them in maximum pitch diameter position to prevent separation of said plates by said belt, the arrangement being such that either of said pulleys may be latched selectively in maximum pitch diameter position while the other is permitted to expand under action of the belt thereby providing two ranges of speed variation.

4. In a variable speed transmission mechanism, a pair of expansible V-groove pulleys, a power transmitting element disposed to cooperate with said pulleys, means supporting said pulleys for movement toward or from each other to effect expansion or contraction of said pulleys through action of said power transmitting element upon them, and means to lock either of said pulleys in manner to prevent expansion or contraction thereof while permitting expansion and contraction of the other pulley to effect adjustment of the driving ratio, the arrangement being such that the driving ratio between said pulleys may be varied throughout two speed ranges by locking said pulleys alternatively.

5. In an infinitely variable speed drive mechanism comprising a pair of axially adjustable V-belt pulleys, a belt arranged to cooperate with said pulleys, means to effect axial adjustment of said pulleys to change their effective diameters, and means to lock each pulley individually in the position affording the largest diameter, thereby allowing the other pulley to be adjusted throughout its range of variable diameter.

6. In a variable speed belt transmission of the adjustable effective pitch diameter type, a pair of adjustable pitch diameter pulleys, a constant length belt connecting said pulleys, a spring in each of said pulleys operative to maintain them normally at their positions of greatest pitch diameter, means to effect the locking of either the driving or the driven pulley in its position of maximum pitch diameter, and means to increase the distance between the pulley axes, thereby causing the unlocked pulley to spread against the resilience of said spring in manner to decrease the effective pitch diameter of said pulley.

7. In a speed changing power transmission mechanism of the V-belt and pulley type, a pair of expansible pulleys, a V-belt disposed to cooperate with said pulleys, means arranged to draw said belt into said pulleys to expand them, and locking mechanism associated with each of said pulleys for locking each pulley selectively against expansion and contraction, the arrangement being such that said transmission mechanism may be operated in either of two speed ranges by locking the one or the other pulley while permitting the unlocked pulley to expand or contract under action of the belt.

8. In a speed changing belt transmission mechanism, a plurality of expansible belt receiving pulleys, a belt disposed to cooperate with said pulleys to constitute a driving mechanism, means arranged to draw said belt into engagement with said pulleys in manner to effect adjustment of their operating pitch diameters, and latching mechanism associated with said pulleys and operative to latch them selectively against change in pitch diameter, the arrangement being such that said transmission mechanism may be operated in different speed ranges by latching different pulleys while permitting other pulleys to change pitch diameter under action of said belt.

9. In a speed changing power transmission mechanism of the V-belt and pulley type, a pair of expansible pulleys, a V-belt disposed to cooperate with said pulleys, means arranged to move one of said pulleys relative to the other to draw said belt into said pulleys to expand them, a locking mechanism associated with each of said pulleys to lock it selectively against expansion the arrangement being such that said transmission mechanism may be operated in either a high speed range or a low speed range depending upon which pulley is permitted to expand under action of said belt, a speed indicating pointer associated with said movable pulley for movement with it and a speed indicating scale carrying two series of indicia disposed to cooperate with said pointer, said two series of indicia corresponding with said speed ranges and being read alternatively in accordance with whether the one or the other pulley is locked, whereby the speed of the driven pulley in either range of operation may be ascertained by reading said pointer against the corresponding indicia series.

10. In a speed changing power transmission mechanism of the belt and pulley type, a plurality of expansible pulleys, a belt disposed to cooperate with said pulleys, means arranged to move one of said pulleys relative to the other to cause said belt to act on said pulleys in manner to change their effective pitch diameters, a latching mechanism associated with each of said pulleys to latch it selectively against change in pitch diameter the arrangement being such that said transmission mechanism may be operated in either a high speed range or a low speed range depending upon which pulley is permitted to change diameter under action of said belt, and a speed indicating device associated with said movable pulley for actuation by it, said device including a pointer and a speed indicating scale carrying two series of indicia disposed to cooperate with said pointer, said two series of indicia corresponding with said speed ranges and being read alternatively in accordance with whether the one or the other pulley is latched, whereby the speed of the driven pulley in either range of operation may be ascertained by reading said pointer against the corresponding indicia series.

11. A variable speed drive comprising a driving shaft, a driven shaft, an expansible pulley on each of said shafts, transmission means connecting said pulleys, locking means associated with each of said pulleys, said locking means on said driven pulley being operable to releasably retain said driven pulley in a fixed pitch diameter position, means for varying the pitch diameter of said driving pulley to provide for a selective speed within one speed range, said locking means on said driving pulley being operable to releasably retain said driving pulley in a fixed pitch diameter position, and means for varying the pitch diameter of said driven pulley to provide for a selected speed within a different speed range.

12. In an axially expansible pulley for a variable speed transmission mechanism, a pulley flange having an axially extending hub, a complementary pulley flange disposed to encircle said hub for axial movement relative thereto, a coiled spring disposed to encircle said hub with one end secured to said outer pulley flange, a cap rotatably mounted on said hub and having engagement with the other end of said spring in such manner that said spring exerts torsional and compression forces between said cap and said outer pulley flange, and latching means associated with said cap and operative through torsional action of said spring upon said cap to effect a latching engagement between said cap and said outer pulley flange when said pulley flanges are in predetermined axial relationship, said latching engagement being releasable upon turning said cap relative to said pulley flange to permit axial movement of said outer pulley flange.

13. In a belt pulley of the axially expansible type for a variable speed belt drive, a pulley flange having an axially extending hub, a complementary pulley flange having a hub disposed in telescoping relationship with said axially extending hub, a compression spring disposed to encircle the outer one of said hubs and to engage with one end the corresponding pulley flange, a cap associated with said inner hub and disposed to engage the other end of said spring to confine it, and latching means associated with said cap and operative upon turning said cap to latch said pulley flanges in manner to prevent axial movement between them.

14. In an expansible pulley for a speed changing transmission mechanism, a pair of axially adjustable pulley halves having inner and outer hubs respectively arranged in telescoping relationship, a coiled compression spring disposed to encircle said outer hub, a cap rotatably mounted on said inner hub and extending in manner to engage and confine said spring for urging said pulley halves together, and latching means associated with said cap and operative through rotation thereof to latch said inner hub to said outer hub for preventing axial adjustment of said pulley members.

15. In a variable speed belt driving mechanism, a pair of expansible belt receiving pulleys arranged in driving alignment, resilient means disposed to urge each of said pulleys to expanded diameter position, a belt arranged to cooperate with said pulleys for transmitting power from the one to the other pulley, means to increase the tension in said belt in manner tending to overcome the action of said resilient means and force said pulleys to contracted diameter position, and means to latch either the one or the other of said pulleys in expanded position to restrict the contracting action to the unlatched pulley, whereby two ranges of speed adjustment may be provided.

16. In a variable speed belt drive of the expansible cone pulley type, an expansible cone pulley comprising relatively movable cone elements disposed to form a V-belt groove of variable width, a coiled compression spring arranged to urge said cone elements together by expansive action of said spring in opposition to the action of a belt running between them, and a latch associated with said spring and operative under torsional action of said spring to latch said cone elements in expanded position.

17. In a speed changing power transmission mechanism of the belt and pulley type, a pair of resiliently expansible pulleys, a belt disposed to cooperate with said pulleys, means arranged to stress said belt upon said pulleys to reduce their pitch diameters, and locking mechanism associated with each of said pulleys for locking each pulley selectively against expansion and contraction, the arrangement being such that said transmission mechanism may be operated in either of two speed ranges by locking the one or the other pulley while permitting the pitch diameter of the unlocked pulley to expand resiliently or to contract under action of the belt.

JOSEPH B. ARMITAGE.